United States Patent [19]

Narula et al.

[11] Patent Number: 5,350,719
[45] Date of Patent: Sep. 27, 1994

[54] PREPARATION OF TITANIUM NITRIDE-CONTAINING REFRACTORY MATERIAL COMPOSITES

[75] Inventors: Chaitanya K. Narula, Ann Arbor; Gary M. Crosbie, Dearborn, both of Mich.

[73] Assignee: Ford Motor Company, Dearborn, Mich.

[21] Appl. No.: 972,333

[22] Filed: Nov. 6, 1992

[51] Int. Cl.$^5$ ............................................. C04B 35/58
[52] U.S. Cl. ............................................................. 501/96
[58] Field of Search .................... 51/307, 309; 501/92, 501/96, 98, 97; 423/353

[56] References Cited

U.S. PATENT DOCUMENTS

| | | | |
|---|---|---|---|
| 3,853,567 | 12/1974 | Verbeek | 501/92 |
| 4,208,215 | 6/1980 | Kleiner et al. | 106/73.3 |
| 4,421,528 | 12/1983 | Buljan et al. | 51/309 |
| 4,613,455 | 9/1986 | Suzuki et al. | 252/516 |
| 4,859,639 | 8/1989 | Sterzel | 501/97 |
| 4,900,700 | 2/1990 | Jun et al. | 501/78 |
| 5,087,593 | 2/1992 | Narula | 501/96 |

*Primary Examiner*—Karl Group
*Assistant Examiner*—A. Wright
*Attorney, Agent, or Firm*—Lorraine S. Melotik; Roger L. May

[57] ABSTRACT

A titanium tetrahalide is reacted with a disilazane to prepare a titanium containing organometallic precursor, which is thereafter mixed with a refractory material powder and pyrolyzed to form a titanium nitride-containing refractory material composite containing crystalline titanium nitride.

14 Claims, No Drawings

5,350,719

PREPARATION OF TITANIUM NITRIDE-CONTAINING REFRACTORY MATERIAL COMPOSITES

FIELD OF THE INVENTION

This invention relates generally to the preparation of TiN-containing refractory material composites. More particularly, the invention is directed to the preparation of said composites utilizing a titanium nitride-producing organometallic precursor and at least one refractory material powder.

BACKGROUND OF THE INVENTION

Refractory materials have been used in recent years to prepare advanced materials having several desirable properties such as a high melting point, high hardness, excellent strength, and nonreactivity with a variety of other materials, e.g., corrosive gases. Composites of these refractory materials have also been prepared to provide specific mechanical, strength, and chemical resistivity characteristics. It is known to add titanium to refractory material composites to increase their melting points and electrical conductivities.

U.S. Pat. No. 4,208,215 to Kleiner et al. discloses the preparation of $Si_3N_4$—TiN by a reaction between ammonia and a gaseous mixture of $SiCl_4$ and $TiC_4$ at a temperature from about 1,100° C. to about 1,350° C. The resulting reaction product is then heated in dry nitrogen to a temperature of about 1,400° C. for about two hours to produce crystalline $Si_3N_4$—TiN.

U.S. Pat. No. 4,859,639 to Sterzel discloses a process for preparing $Si_3N_4$—TiN, wherein ammonia is passed through a solution of a silicon halide and a titanium halide to produce a polymer which is thereafter pyrolyzed at a temperature from about 800° C. to about 1,000° C.

U.S. Pat. No. 4,613,455 to Suzuki et al. discloses a ceramic heater containing a $Si_3N_4$—$Y_2O_3$—TiN heater element. The titanium nitride-containing refractory material composite heater element is prepared by mixing together $Si_3N_4$, $Y_2O_3$, and TiN powders, and thereafter sintering the powder mixture at about 1,300° C. for about one hour.

It would be desirable to prepare titanium nitride-containing refractory composite materials by a pyrolysis reaction utilizing a titanium-containing organometallic precursor and at least one refractory material powder.

SUMMARY OF THE INVENTION

Accordant with the present invention, a process for preparing a titanium nitride-containing refractory material composite surprisingly has been discovered. The process comprises the steps of:

A) contacting a titanium tetrahalide with a disilazane at a temperature and for a period of time sufficient to prepare a titanium-containing organometallic precursor;

B) mixing the titanium-containing organometallic precursor with a refractory material powder; and C) heating the mixture of titanium-containing organometallic precursor and refractory material powder to a temperature and for a period of time sufficient to pyrolyze the precursor.

The process of the present invention is particularly well suited for preparing mechanical components requiring high strength at elevated temperatures, e.g., turbine engine blades; and for coating the surfaces of articles to provide wear resistance and corrosion protection therefor; and for making internal combustion engine expansion coefficient compatible components which are also self-lubricating, e.g., valve seats.

DETAILED DESCRIPTION OF THE PREFERRED EMBODIMENT

The present invention is directed to the preparation of titanium nitride-containing refractory material composites. By the term "composite" as it is used herein is meant a solid containing a microscopic mixture of at least two phases; titanium nitride and a refractory material. The novel process involves the reaction of a titanium tetrahalide and a disilazane to prepare a titanium-containing organometallic precursor, mixing the precursor with a refractory material powder, and pyrolyzing the precursor.

The first reactant for use in preparing the titanium nitride-containing refractory material composites of the present invention is a titanium tetrahalide. Titanium tetrahalides are well known compounds to those ordinarily skilled in the chemical arts, and include $TiCl_4$, $TiBr_4$, $TiF_4$, $TiI_4$, and mixtures thereof. A preferred titanium tetrahalide comprises titanium tetrachloride, which may be produced by heating a quantity of titanium dioxide or a titanium-containing ore along with carbon while passing a stream of chlorine gas thereover. Details concerning the manufacture and characteristics of titanium tetrahalides are more fully set forth in "Kirk-Othmer Concise Encyclopedia of Chemical Technology," John Wiley & Sons, New York (1985) pp. 1185–1186.

The second reactant for use according to the present invention is a disilazane having the general formula:

$$R_3SiNHSiR_3 \qquad (I)$$

wherein each R, independently, is hydrogen, a monovalent alkyl radical having 1–3 carbon atoms, phenyl, or a vinyl radical. Examples of contemplated equivalent disilazanes having the same operability and utility are, without limitation,
$(CH_3)_3SiNHSi(CH_3)_3$,
$(C_6H_5)(CH_3)_2SiNHSi(CH_3)_2(C_6H_5)$,
$(CH_2=CH)(CH_3)_2SiNHSi(CH_3)_2(CH=CH_2)$,
$(C_6H_5)(CH_2=CH)(CH_3)SiNH\text{-}Si(CH_3)(CH=CH_2)(C_6H_5)$,
$(CH_2=CH)(C_6H_5)_2SiNHSi(C_6H_5)_2(CH=CH_2)$,
$(CH_2=CH)(C_2H_5)_2SiNHSi(C_2H_5)_2(CH=CH_2)$,
$(CH_2=CH)(C_6H_5)(C_2H_5)SiNH\text{-}Si(C_2H_5)(C_6H_5)(CH=CH_2)$,
$H(CH_3)_2SiNHSi(CH_3)_2H$, $H_2(CH_3)SiNHSi(CH_3)H_2$, and
$H(C_6H_5)(CH_3)SiNHSi(CH_3)(C_6H_5)H$.

Mixtures of disilazanes may likewise conveniently be used for the second reactant. A preferred disilazane comprises hexamethyldisilazane.

Preparation of the titanium-containing organometallic precursors according to the present invention conveniently may be carried out by admixing the titanium tetrahalide and disilazane under rigorously anhydrous conditions. The mixture of these reactants may optionally include a solvent which does not react with the titanium tetrahalide such as, for example, dichloromethane, carbon tetrachloride, toluene, benzene, pentane, hexane, etc. A preferred solvent is dichloromethane. The solvent may comprise up to about 80% by weight of the reaction mixture. The ratio of titanium tetrahalide to disilazane employed in the reaction mixture may vary on a molar basis from about 1:0.5 to about 1:3. Preferably the ratio is from about 1:1 to about 1:2. The reaction is generally effected at temperatures in the range from about $-100°$ C. to about $100°$ C. Preferably, the reaction is carried out at a temperature from about $-80°$ C. to about $30°$ C. The time required for complete reaction to occur is not sharply critical, and may vary over wide limits from several minutes to several hours. Thus, the titanium-containing soluble organometallic precursor forms in the reaction mixture and may be vacuum stripped to prepare a free flowing powder.

While not wishing to be bound by an particular theory regarding the formation and composition of the titanium-containing organometallic precursors, it is believed that specific precursor compounds are generated, which are distinct based upon the ratio of starting reactants.

In the case where an equimolar mixture of a titanium tetrahalide and a disilazane are reacted together, general and infrared spectral analyses as well as NMR analyses of the resultant organometallic precursor seem to suggest that the following structure is formed:

$$[R_3SiNHTiZ_3]_x \qquad (II)$$

wherein R is as defined hereinabove, Z is a halo radical, and x is from about 1 to about 3. These structures may be highly crosslinked via interactions between halo and/or trimethylsilylamino bridges.

In a preferred embodiment of the present invention, wherein titanium tetrachloride is reacted with two molar equivalents of a disilazane, analyses suggest that the following diimido-bridged structure is formed:

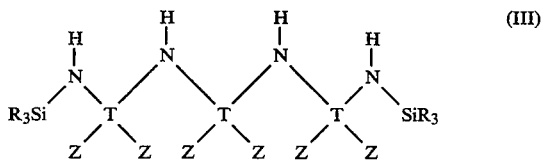
(III)

wherein R is as defined hereinabove. These structures may initially crosslink via the formation of NH bridges, in combination with the loss of chlorotrimethylsilane. Thereafter, further crosslinking may occur via bridging between chloro, amino, and/or trimethylsilylamino groups.

The refractory material powders useful for preparing the titanium nitride-containing refractory material composites of the present invention are well known in the art. They include, but at not necessarily limited to powders prepared from $Si_3N_4$, $ZrB_2$, $CrB_2$, $WB$, $ZrC$, $Cr_3C_2$, $W_2C$, $B_4C$, $SiC$, $ZrN$, $Ta_2N$, $CrN$, $BN$, $Al_2O_3$, $BeO$, $CeO_2$, $Cr_2O_3$, $MgO$, $SiO_2$, $ZrO_2$, and the like, as well as mixtures thereof. A preferred refractory material comprises $Si_3N_4$. Silicon nitride powder may be prepared by reacting together a silicon halide such as $SiCl_4$ and ammonia, and thereafter heating the reaction product to a temperature from about $800°$ C. to about $1,200°$ C. to prepare amorphous $Si_3N_4$. The average refractory material powder particle size conveniently may be from about 0.1 micron to about 100 microns. Preferably, the powder particle size averages from about 0.1 micron to about 5 microns.

The titanium-containing organometallic precursor and refractory material powder is thoroughly mixed utilizing conventional equipment, to form a pyrolyzable mixture. The weight ratio of titanium-containing organometallic precursor to refractory material powder may vary over wide limits from about 1:1,000 to about 1,000:1, and is not sharply critical to the successful practice of the present invention. Preferably, the weight ratio is from about 1:50 to about 1:1, calculated as TiN in $Si_3N_4$.

Alternatively, the refractory material powder may be added to solution containing the titanium-containing organometallic precursor precipitate, and the volatile materials driven off by conventional techniques to prepare the pyrolyzable mixture. The mixture of titanium-containing organometallic precursor and refractory material powder is then heated in an inert atmosphere at a temperature and for a time sufficient to pyrolyze the titanium-containing organometallic precursor and form the titanium nitride-containing refractory material composite. The inert atmosphere may include, for example, ammonia, nitrogen, argon, or mixtures thereof; or may be a vacuum. A preferred inert atmosphere comprises ammonia. Pyrolysis of the mixture to form the titanium nitride-containing refractory material composite conveniently occurs at a temperature of at least about $600°$ C. The time required for complete pyrolysis may vary over wide limits, depending upon the rate at which the titanium-containing organometallic precursor and refractory material mixture is heated, from several minutes to several hours. The resultant titanium nitride-containing refractory material composite contains titanium nitride which is substantially crystalline.

The titanium-containing organometallic precursor and refractory material powder mixture may also be formed by conventional means into particles, fibers, bulk solids, etc., and thereafter pyrolyzed according to the present invention to produce titanium nitride-containing refractory material composite abrasive grit, reinforcing fibers, cutting tools, turbine engine blades, and the like. Moreover, the pyrolyzable mixture may be applied to the surface of an article by conventional methods such as pressing or molding, and thereafter pyrolyzed to form a titanium nitride-containing refractory material composite coating thereon. The sintering aids $Y_2O_3$ and $Al_2O_3$ can also be added to the precursor. A preferred method comprises dissolving $Y[Al(OR)_4]_3$ in an alcohol, adding precursor to the solution, and evaporating the alcohol. The resultant product is then exposed to humidity to convert the $Y[Al(OR)_4]_3$ to $Y_2O_3$ and $Al_2O_3$.

EXAMPLE

About 12.12 g of hexamethyldisilazane is reacted with a solution of about 7.12 g of titanium tetrachloride in dichloromethane at a temperature of about $-78°$ C., to produce a red-orange solution. The reaction mixture is warmed to about $0°$ C., and about 5.7 g of amorphous $Si_3N_4$ powder is added. The resultant mixture is stirred and warmed to about room temperature. Volatiles are removed from the mixture in a vacuum and the resultant residue is pyrolyzed in an ammonia atmosphere at a temperature of about $600°$ C. for about three hours. X-ray diffraction indicates that the pyrolyzed composite contains crystalline TiN.

The pyrolyzed composite is further pyrolyzed at a temperature of about $1,600°$ C. for a period of about one hour. X-ray diffraction indicates that the composite pyrolyzed at the higher temperature contains crystalling TiN and $\beta$-Si$_3$N$_4$.

This example may be repeated with similar success by substituting the generically or specifically described reactants and/or reaction conditions recited herein for those used in the preceding example.

Form the foregoing description, one skilled in the art can easily ascertain the essential characteristics of the invention, and without departing from the spirit and scope thereof, can make various changes and modifications to the invention to adapt it to various usages and conditions.

What is claimed is:

1. A process for preparing a titanium nitride-containing refractory material solid composite, comprising the steps of:
    A) contacting a titanium tetrahalide with a disilazane at a temperature and for a period of time sufficient to prepare a titanium-containing organometallic precursor;
    B) mixing the titanium-containing organometallic precursor with a refractory material powder, the weight ratio of titanium-containing organometallic precursor to refractory material powder being from about 1:50 to about 1:1;
    C) heating the mixture of titanium-containing organometallic precursor and refractory material powder in an inert atmosphere to a temperature of at least about 600° C. and for a period of time sufficient to pyrolyze the precursors; and
    D) further heating the pyrolyzed mixture at a temperature of at least about 1,600° C. to densify the pyrolyzed mixture to a solid composite.

2. The process for preparing a titanium nitride-containing refractory material composite according to claim 1, wherein the titanium tetrahalide comprises titanium tetrachloride.

3. The process for preparing a titanium nitride-containing refractory material composite according to claim 1, wherein the disilazane comprises hexamethyldisilazane.

4. The process for preparing a titanium nitride-containing refractory material composite according to claim 1, wherein the mole ratio of titanium tetrahalide to disilazane is from about 1:0.5 to about 1.3.

5. The process for preparing a titanium nitride-containing refractory material composite according to claim 4, wherein the mole ratio is from about 1:1 to about 1:2.

6. The process for preparing a titanium nitride-containing refractory material composite according to claim 1, wherein step A is conducted in the presence of a solvent.

7. The process for preparing a titanium nitride-containing refractory material composite according to claim 1, wherein step A is conducted at temperature from about −100° C. to about 100° C.

8. The process for preparing a titanium nitride-containing refractory material composite according to claim 1, wherein the refractory material powder comprises Si$_3$N$_4$.

9. A process for preparing a titanium nitride-containing refractory material composite, comprising the steps of:
    A) contacting a titanium tetrahalide with a disilazane, the mole ratio of titanium tetrahalide to disilazane being from about 1:0.5 to about 1:3, optionally in the presence of a solvent, at a temperature from about −100° C. to about 100° C. and for a period of time sufficient to prepare a titanium-containing organometallic precursor;
    B) mixing the titanium-containing organometallic precursor with a refractory material powder, the weight ratio of titanium-containing organometallic precursor to refractory material powder being from about 1:50 to about 1:1;
    C) heating the mixture of titanium-containing organometallic precursor and refractory material powder in an inert atmosphere to a temperature of at least about 600° C. for a period of time sufficient to pyrolyze the precursor; and
    D) further heating the pyrolyzed mixture at a temperature of at least about 1,600° C. to densify the pyrolyzed mixture to a solid composite.

10. The process for preparing a titanium nitride-containing refractory material composite according to claim 9, wherein the titanium tetrahalide comprises titanium tetrachloride.

11. The process for preparing a titanium nitride-containing refractory material composite according to claim 9, wherein the disilazane comprises hexamethyldisilazane.

12. The process for preparing a titanium nitride-containing refractory material composite according to claim 9, wherein the mole ratio of titanium tetrahalide to disilazane is from about 1:1 to about 1:2.

13. The process for preparing a titanium nitride-containing refractory material composite according to claim 9, wherein the refractory material powder comprises Si$_3$N$_4$.

14. A process for preparing a Si$_3$N$_4$—TiN composite, comprising the steps of:
    A) contacting titanium tetrachloride with hexamethyldisilazane, the mole ration of titanium tetrahalide to hexamethyldisilazane being from about 1:1 to about 1:2, optionally in the presence of a solvent, at a temperature from about −100° C. to about 100° C. and for a period of time sufficient to prepare a titanium-containing organometallic precursor;
    B) mixing the titanium-containing organometallic precursor with Si$_3$N$_4$. the weight ratio of titanium-containing organometallic precursor to Si$_3$N$_4$ being from about 1:50 to about 1:1;
    C) heating the mixture of titanium-containing organometallic precursor and Si$_3$N$_4$ in an inert atmosphere to a temperature of at least 600° C. for a period of time sufficient to pyrolyze the precursor; and
    D) further heating the pyrolyzed mixture at a temperature of at least about 1,600° C. to densify the pyrolyzed mixture to a solid composite.

* * * * *